(12) United States Patent
Watanabe et al.

(10) Patent No.: US 8,920,713 B2
(45) Date of Patent: Dec. 30, 2014

(54) STEEL FOR WELDED STRUCTURE AND PRODUCING METHOD THEREOF

(75) Inventors: Yoshiyuki Watanabe, Tokyo (JP); Kazuhiro Fukunaga, Tokyo (JP); Akihiko Kojima, Tokyo (JP); Ryuji Uemori, Tokyo (JP); Rikio Chijiiwa, Kawasaki (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/138,790

(22) PCT Filed: May 21, 2010

(86) PCT No.: PCT/JP2010/003435
§ 371 (c)(1),
(2), (4) Date: Sep. 28, 2011

(87) PCT Pub. No.: WO2010/134353
PCT Pub. Date: Nov. 25, 2010

(65) Prior Publication Data
US 2012/0027637 A1 Feb. 2, 2012

(30) Foreign Application Priority Data

May 21, 2009 (JP) ................. 2009-123428
May 22, 2009 (JP) ................. 2009-124614
Aug. 21, 2009 (JP) ................. 2009-192387

(51) Int. Cl.
*C22C 38/08* (2006.01)
*C22C 38/04* (2006.01)
(Continued)

(52) U.S. Cl.
CPC ............. *C22C 38/02* (2013.01); *B23K 35/3066* (2013.01); *B23K 35/3073* (2013.01); *C21D 6/005* (2013.01); *C21D 6/008* (2013.01); *C21D 6/02* (2013.01); *C21D 8/0205* (2013.01);
(Continued)

(58) Field of Classification Search
USPC ........ 148/320, 336, 500, 505; 420/83, 84, 85, 420/119, 120, 126, 128, 129
See application file for complete search history.

(56) References Cited

U.S. PATENT DOCUMENTS 5,985,053 A 11/1999 Hara et al.
6,224,689 B1 5/2001 Koo et al.
(Continued)

FOREIGN PATENT DOCUMENTS

CA 2 231 985 9/1998
CA 2 429 439 11/2003
(Continued)

OTHER PUBLICATIONS

English abstract and computer-generated translation of JP 2001-323336 (Nagai et al.), originally published in the Japanese language on Nov. 22, 2001.*
(Continued)

*Primary Examiner* — Scott Kastler
*Assistant Examiner* — Vanessa Luk
(74) *Attorney, Agent, or Firm* — Kenyon & Kenyon LLP

(57) ABSTRACT

A steel for a welded structure includes the following composition: by mass %, C at a C content [C] of 0.010 to 0.065%; Si at a Si content [Si] of 0.05 to 0.20%; Mn at a Mn content [Mn] of 1.52 to 2.70%; Ni at a Ni content [Ni] of 0.10% to 1.50%; Ti at a Ti content [Ti] of 0.005 to 0.015%; O at an O content [O] of 0.0010 to 0.0045%; N at a N content [N] of 0.002 to 0.006%; Mg at a Mg content [Mg] of 0.0003 to 0.003%; Ca at a Ca content [Ca] of 0.0003 to 0.003%; and the balance composed of Fe and unavoidable impurities. A steel component parameter $P_{CTOD}$ is 0.065% or less, and a steel component hardness parameter CeqH is 0.235% or less.

3 Claims, 4 Drawing Sheets

(51) Int. Cl.
*C22C 38/14* (2006.01)
*C22C 38/02* (2006.01)
*B23K 35/30* (2006.01)
*C21D 6/00* (2006.01)
*C21D 6/02* (2006.01)
*C21D 8/02* (2006.01)
*C22C 38/00* (2006.01)
*C22C 38/06* (2006.01)
*C22C 38/12* (2006.01)
*C22C 38/16* (2006.01)

(52) U.S. Cl.
CPC ............ *C21D 8/0226* (2013.01); *C21D 8/0263* (2013.01); *C22C 38/001* (2013.01); *C22C 38/002* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01)
USPC ........... 420/119; 420/120; 420/126; 420/128; 148/336

(56) References Cited

U.S. PATENT DOCUMENTS

| | | | |
|---|---|---|---|
| 6,248,191 | B1 | 6/2001 | Luton et al. |
| 2004/0031544 | A1* | 2/2004 | Hara et al. .................... 148/521 |
| 2007/0181223 | A1* | 8/2007 | Ito et al. ........................ 148/336 |
| 2011/0268601 | A1 | 11/2011 | Watanabe et al. |

FOREIGN PATENT DOCUMENTS

| | | | |
|---|---|---|---|
| CA | 2 602 076 | 6/2008 | |
| EP | 1 143 023 | 10/2001 | |
| EP | 1221493 | 7/2002 | |
| EP | 2 060 643 | 5/2009 | |
| EP | 2 385 149 | 11/2011 | |
| JP | 05-171341 | 7/1993 | |
| JP | 7-278653 | 10/1995 | |
| JP | 09-003590 | 1/1997 | |
| JP | 9-3597 | 1/1997 | |
| JP | 09-157787 | 6/1997 | |
| JP | 09-279235 | * 10/1997 | ............... C21D 8/02 |
| JP | 10-298708 | 11/1998 | |
| JP | 11-279684 | 10/1999 | |
| JP | 2000-96139 | 4/2000 | |
| JP | 2000-345286 | 12/2000 | |
| JP | 2001-323336 | 11/2001 | |
| JP | 2002-030380 | 1/2002 | |
| JP | 2004-162150 | 6/2004 | |
| JP | 2005-256161 | * 9/2005 | ............... C22C 38/00 |
| JP | 2007-002271 | 1/2007 | |
| JP | 2008-163446 | 7/2008 | |
| JP | 2008-169429 | 7/2008 | |
| KR | 10-2002-0028203 | 4/2002 | |
| RU | 2135622 | 8/1999 | |
| RU | 2136775 | 9/1999 | |
| RU | 2198771 | 2/2003 | |
| RU | 2210603 | 8/2003 | |
| RU | 2211877 | 9/2003 | |
| RU | 2215813 | 11/2003 | |
| WO | 2009/072663 | 6/2009 | |

OTHER PUBLICATIONS

Computer-generated translation of JP 09-279235, originally published in the Japanese language on Oct. 28, 1997.*
Computer-generated translation of JP 2005-256161, published originally in the Japanese language on Sep. 22, 2005.*
Korean Office Action, dated Jan. 2, 2012, issued in corresponding Korean application No. 10-2011-7009636, with English translation.
Canadian Office Action, dated Jan. 25, 2012, issued in corresponding Canadian application No. 2,757,223.
International Search Report dated Aug. 10, 2010 issued in corresponding PCT Application No. PCT/JP2010/003435.
European Search Report dated Sep. 19, 2012 issued in corresponding European Application No. 10 77 7589.
Russian Notice of Allowance, dated Jul. 3, 2012, issued in corresponding Russian application No. 2011146832, with an English translation thereof.
International Search Report dated Aug. 10, 2010 issued in corresponding PCT Application No. PCT/JP2010/003344 [With English Translation].
International Search Report dated Aug. 10, 2010 issued in corresponding PCT Application No. PCT/JP2010/003344.
Canadian Office Action dated Oct. 11, 2011 issued in corresponding Canadian Patent Application No. 2,749,154.
Notice of Allowance dated Mar. 2, 2012, issued in corresponding Russian Patent Application No. 2011129331, with an English translation thereof.
European Search Report dated Jun. 19, 2012, issued in corresponding European Patent Application No. 10777561.1.
Machine-English translation of Japanese Patent 2008-169429, Chijiiwa Rikio et al., Jul. 24, 2008.
Office Action dated Mar. 28, 2013 from related U.S. Appl. No. 13/138,119.
Office Action dated Jan. 17, 2012 from related U.S. Appl. No. 13/138,119.
Office Action dated Oct. 4, 2011 from related U.S. Appl. No. 13/138,119.
Notice of Allowance dated Oct. 24, 2013 from related U.S. Appl. No. 13/138,119.

* cited by examiner

STEEL FOR WELDED STRUCTURE AND PRODUCING METHOD THEREOF

BACKGROUND OF THE INVENTION

1. Field of the Invention

The present invention relates to a steel for a welded structure superior in a CTOD property of a heat affected zone (HAZ) in a low heat input welding to a medium heat input welding, and a producing method thereof. Particularly, the present invention relates to a steel for a welded structure far superior in a CTOD property of an FL zone and an IC zone where toughness deteriorates the most in a low heat input welding to a medium heat input welding, and a producing method thereof.

This application is a national stage application of International Application No. PCT/JP2010/003435, filed May 21, 2010, which claims priority to Japanese Patent Application No. 2009-124614 filed on May 22, 2009, Japanese Patent Application No. 2009-123428 filed on May 21, 2009, and Japanese Patent Application No. 2009-192387 filed on Aug. 21, 2009, and the contents of which are incorporated herein by reference.

2. Description of Related Art

In recent years, there has been a demand for a steel for use in harsh environments. For example, as high-strength steel suitable for steel structures such as offshore structures used in a frigid sea area such as the Arctic region, and seismic resistant structures, there is a need for a steel excellent in a CTOD (Crack Tip Opening Displacement) property which is one of fracture toughness parameters. In particular, the weld of the steel needs an excellent CTOD property.

The CTOD property of the heat affected zone (HAZ) is evaluated by test results of two positions (notch section) of an FL zone "Fusion Line: a boundary of a WM (weld metal) and an HAZ (heat affected zone)" and an IC zone "Intercritical HAZ: a boundary of an HAZ and a BM (base metal)". However, only the FL zone considered to obtain the lowest CTOD property has been evaluated in the past.

In conditions where a test temperature is not particularly harsh, for example, −20° C., if the CTOD property of the FL zone is sufficient, the CTOD property of the IC zone is also sufficient, such that it is not necessary to evaluate the CTOD property of the IC zone.

However, under harsh test conditions, for example, −60° C., there are many cases where a CTOD value of the IC zone is not sufficient, such that it is necessary to increase the CTOD property of the IC zone.

In this respect, techniques in which the CTOD property at a harsh test temperature (for example, −60° C.) of welded joint after low heat input and medium heat input is improved are disclosed (for example, refer to Patent Citation 2). However, in these techniques, the CTOD property of the IC zone is not disclosed.

In addition, for example, techniques in which Charpy absorbed energy of welded joint after a large heat input welding is improved are disclosed (for example, refer to Patent Citation 3 to Patent Citation 6). However, in these techniques, the CTOD property (property of brittle crack initiation) that is an important factor as a structural material is not disclosed, and the test is only performed with respect to a relatively high temperature condition (for example, −10° C.).

In the above-described techniques, for example, a relatively large amount of O is contained in steel for securing a sufficient amount of Ti-oxides which act as transformation nuclei for the generation of an intragranular ferrite (IGF) in the FL zone. In addition, for example, for making a microstructure fine after welding, an element, which stabilizes austenite and increases hardenability, is added in a certain amount or more. However, in this method, it is difficult to secure the CTOD value of the IC zone of the steel in a harsh environment of about −60° C. while securing properties (for example, the strength or toughness of a base metal, and the CTOD value of the FL zone) necessary for a structural material for welded structure.

[Patent Citation 1] Japanese Unexamined Patent Application Publication, First Publication No. 2007-002271
[Patent Citation 2] Japanese Unexamined Patent Application Publication, First Publication No. 2008-169429
[Patent Citation 3] Japanese Unexamined Patent Application Publication, First Publication No. 2002-030380
[Patent Citation 4] Japanese Unexamined Patent Application Publication, First Publication No. 5-171341
[Patent Citation 5] Japanese Unexamined Patent Application Publication, First Publication No. 2004-162150
[Patent Citation 6] Japanese Unexamined Patent Application Publication, First Publication No. 11-279684

SUMMARY OF THE INVENTION

Here, the present invention provides a high-strength steel having an excellent CTOD (fracture toughness) property where the CTOD property of the IC zone is also sufficient in addition to the property of the FL zone at −60° C., in welding (for example, multilayer welding) of a low heat input to a medium heat input (for example, 1.5 to 6.0 kJ/mm at a plate thickness of 50 mm), and a producing method thereof.

The inventors made a thorough investigation of a method for improving a CTOD property of both an FL zone and an IC zone that are a weld where toughness deteriorates the most in welding of a low heat input to a medium heat input.

As a result, the inventors found that for improving the CTOD property of both the FL zone and IC zone, it is the most important to reduce non-metallic inclusions, specifically, it is essential to reduce O (oxygen in steel). In addition, the inventors found that since intragranular ferrite (IGF) decreases due to the reduction of O, it is necessary to reduce an alloy element that deteriorates the CTOD property of the FL region. Furthermore, the inventors found that for improving the CTOD property of the IC region, a reduction in hardness is effective in addition to the reduction of the oxygen in steel. From the findings, the inventors completed the present invention.

The summary of the present invention is as follows.

(1) A steel for a welded structure, comprising the following composition: by mass %, C at a C content [C] of 0.010 to 0.065%; Si at a Si content [Si] of 0.05 to 0.20%; Mn at a Mn content [Mn] of 1.52 to 2.70%; Ni at a Ni content [Ni] of 0.10% to 1.50%; Ti at a Ti content [Ti] of 0.005 to 0.015%; O at an O content [O] of 0.0010 to 0.0045%; N at a N content [N] of 0.002 to 0.006%; Mg at a Mg content [Mg] of 0.0003 to 0.003%; Ca at a Ca content [Ca] of 0.0003 to 0.003%; and a balance composed of Fe and unavoidable impurities, wherein, a P content [P] is limited to 0.008% or less, a S content [S] is limited to 0.005% or less, an Al content [Al] is limited to 0.004% or less, a Nb content [Nb] is limited to 0.010% or less, a Cu content [Cu] is limited to 0.50% or less, a V content [V] is limited to 0.020% or less, and when a steel component parameter $P_{CTOD}$ is defined by a following equation (1), $$P_{CTOD} = [C] + [V]/3 + [Cu]/22 + [Ni]/67 \quad (1)$$

and a steel component hardness parameter CeqH is defined by a following equation (2), $$CeqH=[C]+[Si]/4.16+[Mn]/14.9+[Cu]/12.9+[Ni]/105+1.12[Nb]+[V]/1.82 \quad (2),$$

the $P_{CTOD}$ is 0.065% or less, and the CeqH is 0.235% or less.

(2) In the steel material for welding according to (1), the Cu content [Cu] is further limited to 0.03 to 0.24%, and the Ni content [Ni] is further limited to 0.10 to 0.49%.

(3) In the steel material for welding according to (1) or (2), a total amount of Mg and Ca is further limited to 0.0030% or less by mass %.

(4) A producing method of a steel for welded structure, comprising: continuously casting steel to manufacture a slab satisfying the composition according to (1) or (2); and heating the slab to a temperature of 950° C. to 1100° C. and then subjecting the slab to a thermo-mechanical control process.

According to the present invention, it is possible to provide a steel excellent in HAZ toughness in welding of a low heat input to a medium heat input. Particularly, it is possible to provide a steel excellent in a CTOD property (low-temperature toughness) of an FL zone and an IC zone where toughness deteriorates the most in welding, such as multilayer welding, of the low heat input to the medium heat input. Therefore, it is possible to provide a high-strength and high-toughness steel for a structure such as offshore structures and seismic resistant structures used in a harsh environment.

DETAILED DESCRIPTION OF THE INVENTION

Hereinafter, the present invention will be described in detail.

According to the investigation of the inventors, for sufficiently improving the CTOD property of the FL zone and IC zone at −60° C., in welding of a low heat input to a medium heat input (for example, 1.5 to 6.0 kJ/mm at a plate thickness of 50 mm), it is the most important to reduce oxide-based non-metallic inclusions, and it is essential to reduce the amount of O (oxygen in steel).

In the conventional technique, for obtaining a steel excellent in the CTOD property of the FL zone, as transformation nuclei of an intragranular ferrite (IGF), the oxide-based non-metallic inclusion represented by Ti-oxides is used and it is necessary to add O to a certain amount. According to the investigation of the inventors, for improving the CTOD property of the FL zone and the IC zone at −60° C., it is necessary to reduce the oxide-based non-metallic inclusion.

Figure 1:
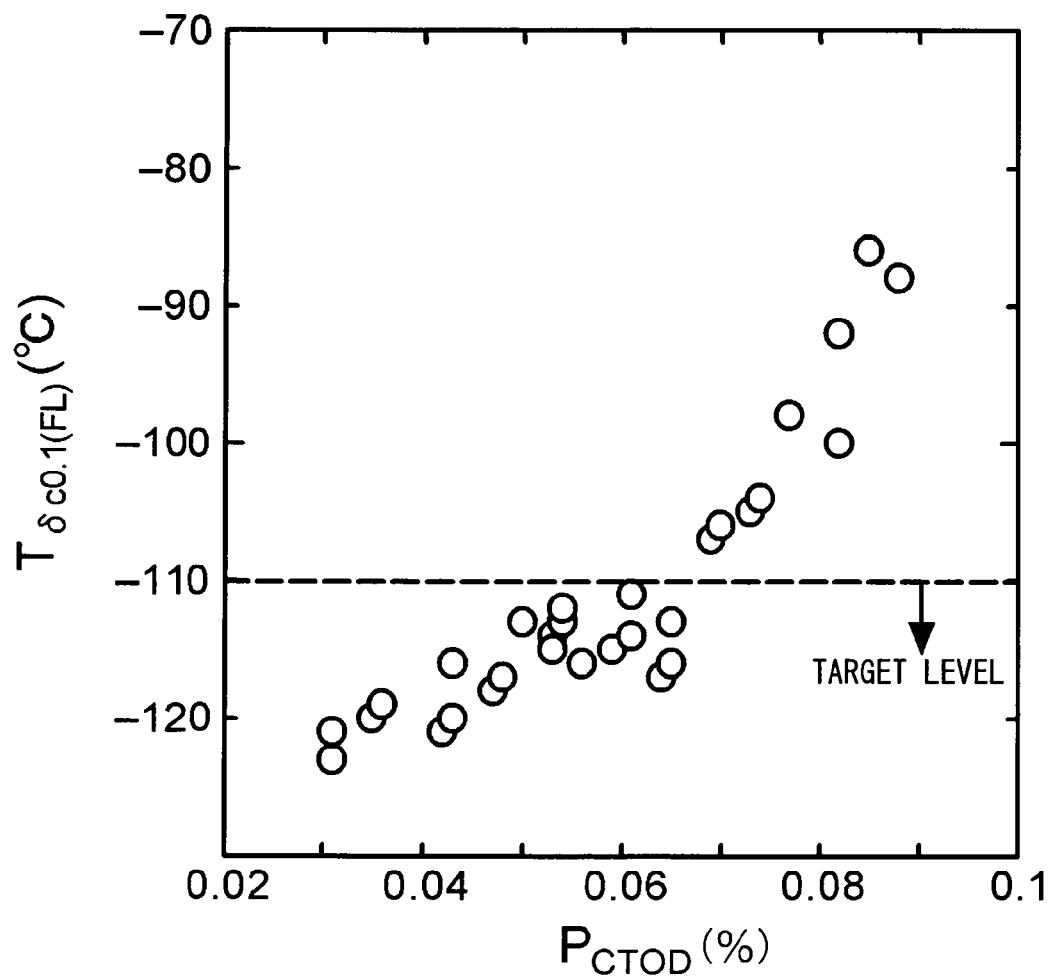
FIG. 1 is a diagram illustrating a relationship between a steel composition parameter $P_{CTOD}$ and a CTOD property ($T_{\delta c0.1(FL)}$) in a synthetic FL test using simulated thermal cycle.

Due to the reduction of O, the IGF decreases, such that it is necessary to reduce an alloy element that deteriorates the CTOD property of the FL zone. FIG. 1 shows a relationship between a CTOD property ($T_{\delta c0.1(FL)}$) of FL-equivalent synthetic HAZ and a steel composition parameter $P_{CTOD}$. Here, the steel composition parameter $P_{CTOD}$ expressed by an equation (1) is an empirical equation derived by testing a plurality of vacuum melted steels at an experimental laboratory, and by analyzing the CTOD property ($T_{\delta c0.1(FL)}$) of FL-equivalent synthetic HAZ and a steel composition.

$$P_{CTOD}=[C]+[V]/3+[Cu]/22+[Ni]/67 \quad (1)$$

Here, [C], [V], [Cu], and [Ni] represent the amounts (mass %) of C, V, Cu, and Ni in steel, respectively. For example, when Cu is not contained in steel, the amount of Cu is 0%.

In regard to the FL-equivalent synthetic HAZ shown in FIG. 1, based on findings obtained from a plurality of experiments, the CTOD property $T_{\delta c0.1(FL)}$ at −110° C. or less is a target level ($T_{\delta c0.1(FL)} \leq 110°$ C.) as the structural steels. In the target level, in regard to an FL notch test of a practical welded joint of a steel plate having the thickness of 50 to 100 mm, it is possible to stably secure a CTOD (δc) value of 0.25 mm or more at −60° C. From FIG. 1, in regard to the FL-equivalent synthetic HAZ, to maintain the $T_{\delta c0.1(FL)}$ at −110° C. or less, it can be seen that it is necessary to control the steel composition parameter $P_{CTOD}$ to be 0.065% or less. In addition, as the CTOD (δc) value becomes large, the toughness (for example, energy absorption due to plastic strain) is high.

The FL-equivalent synthetic HAZ is a zone corresponding to a heat input of the FL zone of a specimen to which an FL-equivalent synthetic thermal cycle described below is performed. The FL-equivalent synthetic thermal cycle (Triple cycle) is performed with respect to a specimen of 10 mm×20 mm (cross-section) under the following conditions:

$1^{st}$ cycle: Maximum heating temperature 1400° C. (800 to 500° C. is cooled in 22 seconds)

$2^{nd}$ cycle: Maximum heating temperature 760° C. (760 to 500° C. is cooled in 22 seconds)

$3^{rd}$ cycle: Maximum heating temperature 500° C. (500 to 300° C. is cooled in 60 seconds)

Figure 4A:
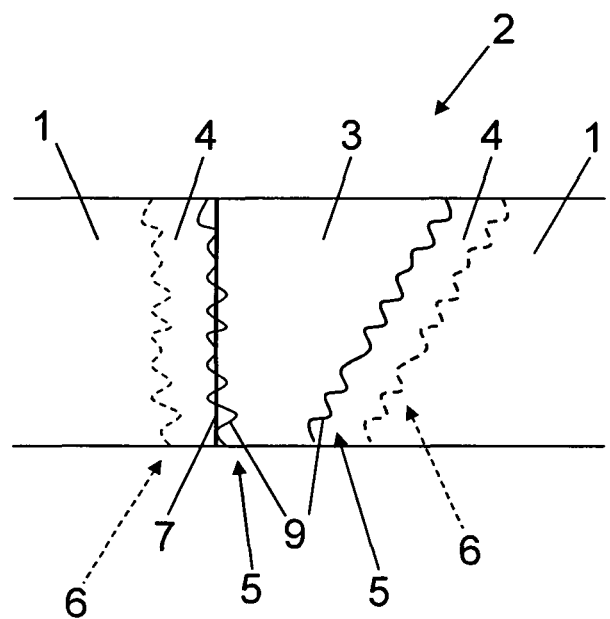
FIG. 4A is a schematic diagram illustrating an FL notch position of a CTOD test.

As shown in FIG. 4A, an FL notch 7 in a weld 2 is located in an FL zone 5 that is a boundary of an HAZ 4 and a WM 3. In the following CTOD test by the FL notch, the relationship between a load and an opening displacement of the FL zone 5 is measured.

The specimen is evaluated by a CTOD test of BS 5762 method (British Standards) and thereby $T_{\delta c0.1(FL)}$ of FIG. 1 is obtained. Here, the $T_{\delta c0.1(FL)}$ is a temperature (° C.) where the lowest value of the CTOD (δc) values, which are obtained using three specimens at each test temperature, exceeds 0.1 mm. In addition, when considering the effect of plate thickness in the CTOD test, in regard to the FL notch section (FL zone) of the practical welded joint of the steel plate having the thickness of 50 to 100 mm, it is necessary to maintain the $T_{\delta c0.1(FL)}$ at −110° C. or less as described above so that the CTOD (δc) value of 0.25 mm or more is stably secured at −60° C.

In addition, the inventors found that the reduction of hardness is effective, in addition to the reduction of oxygen in steel, in order to improve the CTOD property of the IC zone.

Figure 2:
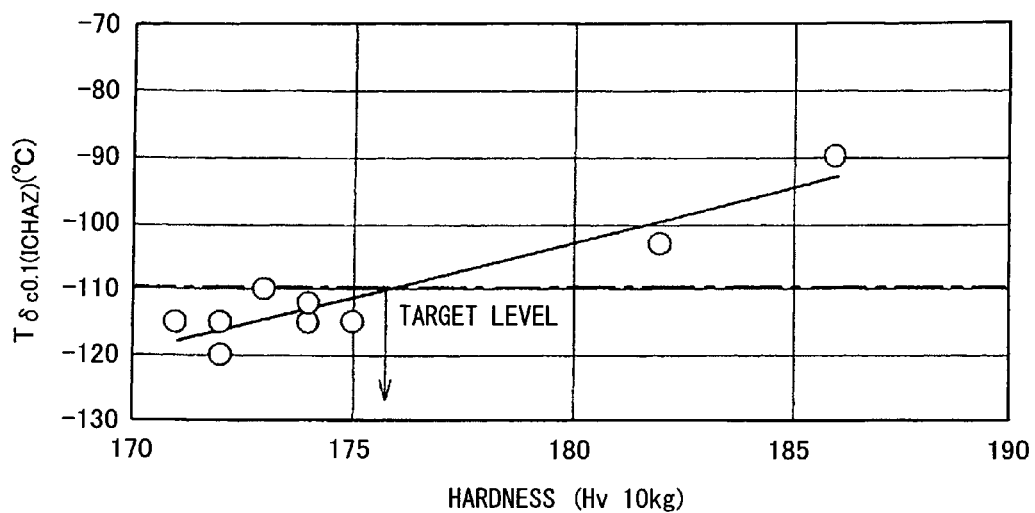
FIG. 2 is a diagram illustrating a relationship between HAZ hardness and a CTOD property $T_{\delta c0.1(ICHAZ)}$ in a synthetic ICHAZ test using simulated thermal cycle.
Figure 3:
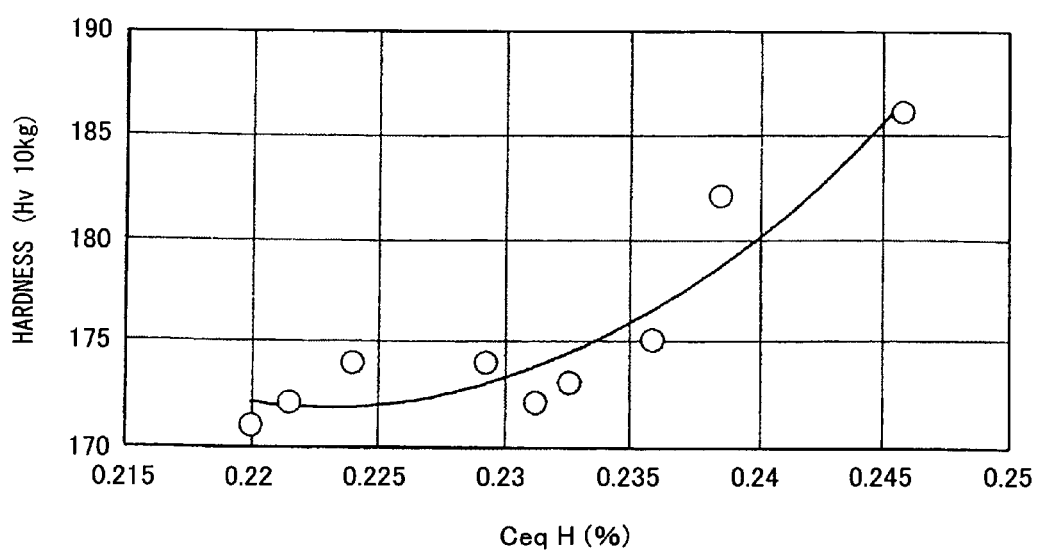
FIG. 3 is a diagram illustrating a relationship between CeqH and HAZ hardness in a synthetic ICHAZ test using simulated thermal cycle.

FIG. 2 shows a relationship between the CTOD property of a specimen which is subjected to an ICHAZ (intercritical HAZ)-equivalent synthetic thermal cycle as described later and ICHAZ-equivalent synthetic HAZ hardness. In addition, FIG. 3 shows a relationship between a steel composition hardness parameter CeqH and an ICHAZ-equivalent synthetic HAZ hardness.

Here, as shown in FIG. 2, in order to maintain the $T_{\delta c0.1(ICHAZ)}$ of the ICHAZ-equivalent synthetic HAZ (cross-section: 10 mm×20 mm) at −110° C. or less, it is necessary to maintain the HAZ hardness (Vickers hardness test under a load of 10 kgf) at 176 Hv or less. Therefore, from FIG. 3, it is necessary to control the steel composition hardness parameter CeqH at 0.235% or less. In order to further lower the hardness, it is preferable that the steel composition hardness parameter CeqH is 0.225% or less.

In addition, as a fracture toughness test method, a CTOD test of BS 5762 method (British Standards) is adopted. In addition, ICHAZ-equivalent synthetic thermal cycle conditions (Triple cycle) are as follows:

1$^{st}$ cycle: Maximum heating temperature 950° C. (800 to 500° C. is cooled in 20 seconds)

2$^{nd}$ cycle: Maximum heating temperature 770° C. (770 to 500° C. is cooled in 22 seconds)

3$^{rd}$ cycle: Maximum heating temperature 450° C. (450 to 300° C. is cooled in 65 seconds)

Figure 4B:
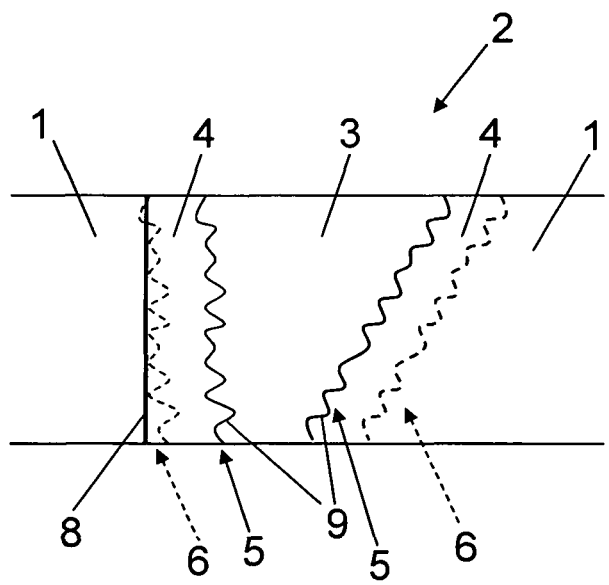
FIG. 4B is a schematic diagram illustrating an IC notch position of a CTOD test.

As shown in FIG. 4B, an IC notch 8 in the weld 2 is located at an IC zone (ICHAZ) 6 that is a boundary of a base metal 1 and the HAZ 4. In a CTOD test by the IC notch, the relationship between a load and the opening displacement of the IC zone 6 is measured.

Here, the steel composition hardness parameter CeqH is an empirical equation obtained by a multiple regression of a property of steel (hardness) and a steel composition, and is defined as follows:

$$CeqH=[C]+[Si]/4.16+[Mn]/14.9+[Cu]/12.9+[Ni]/105+1.12[Nb]+[V]/1.82 \qquad (2),$$

In addition, [C], [Si], [Mn], [Cu], [Ni], [Nb], and [V] are the amounts (mass %) of C, Si, Mn, Cu, Ni, Nb, and V in steel, respectively. For example, when Cu is not contained in steel, the amount of Cu is 0%.

Even when the $P_{CTOD}$ and CeqH are limited as described above, if the amount of each alloy element contained in steel is not appropriately controlled, it is difficult to produce a steel having both high strength and an excellent CTOD property.

Hereinafter, the limitation range and a reason for limitation of the steel composition will be described. Here, the described % is a mass %.

C: 0.010 to 0.065%

For obtaining sufficient strength, it is necessary to contain 0.010% or more of C. However, at a C content [C] exceeding 0.065%, a property of a welding HAZ deteriorates and the CTOD property at −60° C. is not sufficient. For this reason, the upper limit of the C content [C] is 0.065%. Therefore, the C content [C] is from 0.015 to 0.065%

Si: 0.05 to 0.20%

For obtaining an excellent HAZ toughness, it is preferable that the Si content [Si] is as small as possible. However, since the Al content [Al] is limited as described later, for deoxidation, the Si content [Si] is necessarily 0.05% or more. However, when the Si content [Si] exceeds 0.20%, the HAZ toughness deteriorates, therefore the upper limit of the Si content [Si] is 0.20%. Therefore, the Si content [Si] is 0.05 to 0.20%. For obtaining further excellent HAZ toughness, it is preferable that the Si content [Si] is 0.15% or less or is 0.13% or less.

Mn: 1.52 to 2.70%

Mn is an inexpensive element that has a large effect on the optimization of a microstructure. In addition, it is unlikely that the HAZ toughness deteriorates due to the addition of Mn. Therefore, it is preferable that the additional amount of Mn is as large as possible. However, when the Mn content exceeds 2.70%, the ICHAZ hardness increases, and the toughness is deteriorated. Therefore, the upper limit of the Mn content [Mn] is 2.70%. In addition, when the Mn content [Mn] is less than 1.52%, since the effect of improving the microstructure is small, the lower limit of the Mn content [Mn] is 1.52%. Therefore, the Mn content [Mn] is from 1.52 to 2.70%. For further improving the HAZ toughness, it is preferable that the Mn content [Mn] is 1.55% or more, more preferably is 1.6% or more, and most preferably is 1.7% or more.

Ni: 0.10% to 1.50%

Ni is an element that does not deteriorate the HAZ toughness much, that improve the strength and toughness of the base metal, and that does not increase the ICHAZ hardness much. However, Ni is an expensive alloy element, and when contained in steel excessively, Ni may cause surface cracks. Therefore, the upper limit of the Ni content [Ni] is 1.50%. On the other hand, in order to have the above-described effect of the addition of Ni sufficiently, it is necessary to contain at least 0.10% of Ni. Therefore, the Ni content [Ni] is from 0.10 to 1.50%. For improving the strength and toughness of the base metal without increasing the ICHAZ hardness much, it is preferable that the Ni content [Ni] is 0.20% or more, more preferably is 0.30% or more. In addition, for giving weather resistance to the steel material, it is preferable that the Ni content [Ni] is 0.40% or more, and more preferably 0.50% or more. In addition, for reliably preventing surface cracks, it is preferable that the Ni content [Ni] is 1.20% or less, and more preferably is 1.0% or less. In a case where the strength and toughness of the base metal can be secured by the addition of other elements, it is most preferable that the Ni content [Ni] is 0.80% or less for further securing economic efficiency. In addition, as described later, in order to suppress Cu cracking of a slab when Cu is added according to the necessity, it is preferable that the Ni content [Ni] is equal to half or more of the Cu content [Cu].

For securing the strength and toughness of the base metal in a state where the ICHAZ toughness is reliably secured, it is preferable that the total amount of the Mn content [Mn] and the Ni content [Ni] is adjusted. For further reliably securing the ICHAZ toughness, it is preferable that Ni is limited to from 0.5 to 1.50%, when the Mn content is from 1.52 to 2.0%. Similarly, it is preferable that Ni is limited to from 0.10 to 0.50%, when the Mn content is from 2.0 to 2.7%.

P: 0.008% or less (including 0%)

S: 0.005% or less (including 0%)

P and S are elements that decrease the toughness and are contained as unavoidable impurities. Therefore, it is needed to decrease the P content [P] and the S content [S] so as to secure the toughness of the base metal and the HAZ toughness. However, there are restrictions of industrial production, such that the upper limits of the P content [P] and the S content [S] are 0.008% and 0.005%, respectively. For obtaining further excellent HAZ toughness, it is preferable that the P content [P] is limited to 0.005% or less, and the S content [S] is limited to 0.003% or less.

Al: 0.004% or less (excluding 0%)

Since it is necessary to generate Ti-oxides, it is preferable that the Al content [Al] is as small as possible. However, there are restrictions of industrial production, such that the upper limit of the Al content [Al] is 0.004%.

Ti: 0.005 to 0.015%

Ti generates Ti-oxides and makes the microstructure fine. However, when the Ti content [Ti] is too much, Ti generates TiC and thereby deteriorates the HAZ toughness. Therefore, the appropriate range of Ti content [Ti] is 0.005 to 0.015%. For further improving the HAZ toughness, it is preferable that the Ti content [Ti] is 0.013% or less.

Nb: 0.010% or less (including 0%)

Nb may be contained as an impurity, and improves the strength and toughness of the base metal, but decreases the HAZ toughness. The range of the Nb content [Nb] not significantly decreasing the HAZ toughness is 0.010% or less. Therefore, the Nb content [Nb] is limited to 0.010% or less. For further improving the HAZ toughness, it is preferable that the Nb content [Nb] is limited to 0.002% or less (including 0%).

O: 0.0010 to 0.0045%

It is essential that the O content [O] is 0.0010% or more to secure the generation of Ti-oxides as IGF nuclei of the FL zone. However, when the O content [O] is too high, the size of the oxides and number thereof become excessive, whereby the CTOD property of the IC zone deteriorates. Therefore, the O content [O] is limited to the range of 0.0015 to 0.0045%. For obtaining further excellent HAZ toughness, it is preferable that the O content [O] is 0.0030% or less, and more preferably is 0.0028% or less.

N: 0.002 to 0.006%

N is necessary to generate Ti-nitrides. However, when the N content [N] is less than 0.002%, the effect of generating Ti-nitrides is small. In addition, when the N content [N] exceeds 0.006%, surface cracks are generated when producing a slab, such that the upper limit of the N content [N] is 0.006%. Therefore, the N content [N] is from 0.002 to 0.006%. For obtaining further excellent HAZ toughness, it is preferable that the N content [N] is 0.005% or less.

Mg: 0.0003 to 0.003%

Mg is an important alloy element of the invention, and is added mainly as a deoxidizing agent or a sulfide generating element. When the amount of Mg added is 0.003% or less, a coarse oxide or sulfide is not generated and thereby a preferable base metal and HAZ toughness are obtained. In addition, in order to expect a sufficient generation of an oxide necessary as a pinning particle, it is necessary to add 0.0003% or more. Therefore, the range of the Mg content [Mg] is from 0.0003 to 0.003%.

Ca: 0.0003 to 0.003%

Ca generates a sulfide and thereby suppresses the generation of extended MnS, and improves a property of the steel material in the through-thickness direction, particularly, a lamellar tearing resistance. Furthermore, Ca has substantially the same effect as that of Mg, accordingly, Ca is an important element of the invention. To obtain the above-described effects sufficiently, it is necessary to add 0.0003% or more. In addition, when the Ca content [Ca] is limited to 0.003% or less, the number of coarse oxides is suppressed and a sufficient amount of an ultrafine oxide or sulfide is obtained.

Above-described Mg and Ca are added together, but both of them are strong deoxidizing agents. When a total amount of Mg and Ca is 0.0030% or less, it is possible to more effectively suppress the generation of coarse inclusion and thereby a sufficient toughness is obtained satisfactorily.

Cu: 0.50% or less (including 0%)

Cu is an element that improves the strength and toughness of the base metal without deteriorating the HAZ toughness much, and does not increase the ICHAZ hardness much. If the strength of steel material is sufficiently secured by an element such as C, Mn, and Ni, it is not always necessary to add Cu. Cu may be added if required for strength or the like. However, Cu is a relatively expensive alloy element and the above-described effect is low compared to Ni. When Cu is added excessively, the possibility of the Cu cracking of a slab is increased, such that the Cu content [Cu] is limited to 0.50% or less. The Cu content may be limited to 0.24% or less, or 0.10% or less according to the necessity. Furthermore, when Cu is added to steel or is contained in steel as an impurity, for the prevention of the Cu cracking of a slab, it is preferable that the Cu content [Cu] is double or less of the Ni content [Ni]. In addition, since the solid solubility limit of Cu into ferrite ($\alpha$Fe) is small, $\epsilon$Cu precipitates in the weld HAZ depending on a thermal history during welding and thereby there is a possibility of low temperature toughness decreasing. When, the Cu content [Cu] is limited to 0.03% or less, it is possible to reliably secure a low temperature toughness of a product. Particularly, in the case of using a method of a large heat input welding, when the Cu content [Cu] is 0.01% or less, it is possible to further reliably secure the low temperature toughness.

V: 0.020% or less (including 0%)

V is effective in improving the strength of the base metal. Therefore, V may be added as necessary. However, when V exceeding 0.020% is added, the HAZ toughness is largely decreased. Therefore, the V content [V] is limited to 0.020% or less. For sufficiently suppressing a decrease in the HAZ toughness, it is preferable that the V content [V] is limited to 0.010% or less. If the strength of steel is sufficiently secured by an element such as C, Mn, and Ni, it is not always necessary to add V. Even when V is selectively added for reasons of strength, it is preferable to limit the V content [V] to be as small as possible. Therefore, it is more preferable that V content [V] is 0.005% or less.

The steel for welded structure according to the present invention contains the above-described chemical components or these chemical components are limited, and the balance includes Fe and unavoidable impurities. However, the steel plate according to the present invention may contain other alloy elements as elements for the purpose of further improving corrosion resistance and hot workability of the steel plate itself or as unavoidable impurities from auxiliary raw material such as scrap, in addition to the above-described chemical components. However, in order to allow the above-described effects (improvement in toughness of the base metal or the like) of the above-described chemical component (Ni or the like) to be sufficiently exhibited, it is preferable that other alloy elements (Cr, Mo, B, Ca, Mg, Sb, Sn, As, and REM) are limited as described below. Each amount of the alloy elements includes 0%.

Cr decreases the HAZ toughness, such that it is preferable that the Cr content [Cr] is 0.1% or less, more preferably is 0.05% or less, and most preferably is 0.02% or less.

Mo decreases the HAZ toughness, such that it is preferable that the Mo content [Mo] is 0.05% or less, more preferably is 0.03% or less, and most preferably is 0.01% or less.

B increases the HAZ hardness and decreases the HAZ toughness, such that it is preferable that the B content [B] is 0.0005% or less, more preferably is 0.0003% or less, and most preferably is 0.0002% or less.

Sb deteriorates the HAZ toughness, such that it is preferable that the Sb content [Sb] is 0.005% or less, more preferably is 0.003% or less, and most preferably is 0.001% or less.

Sn deteriorates the HAZ toughness, such that it is preferable that the Sn content [Sn] is 0.005% or less, more preferably is 0.003% or less, and most preferably is 0.001% or less.

As deteriorates the HAZ toughness, such that it is preferable that the As content [As] is 0.005% or less, more preferably is 0.003% or less, and most preferably is 0.001% or less.

REM has an effect of suppressing the generation of the Ti-oxides, such that it is preferable that the REM content [REM] is 0.005% or less, more preferably is 0.003% or less, and most preferably is 0.001% or less.

As described above, the steel for welded structure according to the present invention contains the above-described chemical components as steel composition or these chemical components are limited, and the balance is composed of Fe and unavoidable impurities. However, since the steel for welded structure according to the present invention is used as a structural material, it is preferable that the minimum dimension (for example, plate thickness) of the steel is 6 mm or more. When considering usage as the structural material, the minimum dimension (for example, plate thickness) of the steel may be 100 mm or less.

In a producing method of the steel for welded structure according to the present invention, the steel of which each amount of the elements and each of the parameters ($P_{CTOD}$ and CeqH) are limited as described above is used.

In a method of producing the steel material for welding of the invention, a slab (cast billet) is produced from the above-described steel (molten steel) by a continuous casting method. In the continuous casting method, the cooling rate (solidification rate) of the molten steel is fast, and it is possible to generate large quantities of fine Ti-oxides and Ti-nitrides in the slab.

When the slab is rolled, it is necessary that the reheating temperature of the slab is 950 to 1100° C. When the reheating temperature exceeds 1100° C., the Ti-nitrides become coarse and thereby the toughness of the base metal deteriorates, and thus it is difficult to improve the HAZ toughness.

In addition, when the reheating temperature is less than 950° C., rolling force becomes large, and thereby productivity is deteriorated. For this reason, the lower limit of the reheating temperature is 950° C. Therefore, it is necessary to perform the rolling at a temperature of 950 to 1100° C.

Next, after the reheating, a thermo-mechanical control process is performed. In the thermo-mechanical control process, the rolling temperature is controlled in a narrow range according to a steel composition, and water-cooling is performed if necessary. Through the thermo-mechanical control process, the refining of austenite grains and the refining of the microstructure can be performed and thereby the strength and toughness of the steel can be improved. It is preferable to control the thickness (minimum dimension) of the final steel (for example, steel plate) to be 6 mm or more through the rolling.

Through the thermo-mechanical control process, it is possible to produce the steel having sufficient HAZ toughness in welding but also sufficient toughness of the base metal.

As the thermo-mechanical control process, for example, a method of controlled rolling, a method of a combination of controlled rolling and accelerated cooling (controlled rolling—accelerated cooling), and a method of directly quenching after the rolling and tempering (quenching immediately after the rolling—tempering) may be exemplified. It is preferable that the thermo-mechanical control process is performed by the method of the combination of the controlled rolling and the accelerated cooling. In addition, after producing the steel, even when the steel is reheated to a temperature below $Ar_3$ transformation point for the purpose of dehydrogenation or optimization of strength, the property of the steel is not damaged.

EXAMPLES

Hereinafter, the present invention will be described based on examples and comparative examples.

Using a converter, continuous casting, and rolling process, a steel plate having various kinds of steel compositions was produced, and a tensile test on the strength of the base metal and a CTOD test on a welded joint were performed for the steel plate.

The welded joint used for the CTOD test was manufactured by a weld heat input of 4.5 to 5.0 kJ/mm using submerged arc welding (SAW) method used in a general test welding. As shown in FIGS. 4A and 4B, the FL zone 5 of the welded joint was formed by K-groove so that fusion lines (FL) 9 are substantially orthogonal to the end surface of the steel plate.

In the CTOD test, a specimen having a cross sectional size of t (plate thickness)×2t was used and a notch corresponding to 50% fatigue crack was formed in the specimen. As shown in FIGS. 4A and 4B, notch positions (FL notch 7 and IC notch 8) are the FL zone (boundary of the WM 3 and HAZ 4) 5 and the IC zone (boundary of the HAZ 4 and BM 1) 6. In the CTOD test, the FL notch 7 and the IC notch 8 were tested at −60° C. each time (5 times each, and 10 times in total).

Tables 1 and 2 show chemical compositions of the steels and Tables 3 and 4 show the production conditions of the steel plate (base metal), the properties of the base metal (BM), and the properties of the welded joint.

In addition, symbols of a heat treatment method shown in Tables 3 and 4 are as follows:

CR: Controlled-rolling (rolling at an optimal temperature range for improving the strength and toughness of the steel)

ACC: Controlled-rolling—accelerated cooling (the steel was water-cooled to a temperature range of 400 to 600° C. after controlled rolling, and then was air-cooled)

DQ: Quenching immediately after the rolling—tempering (the steel was quenched to 200° C. or less immediately after the rolling and then was tempered)

In addition, in regard to the results of the CTOD test of the welded joint in Tables 3 and 4, δc (av) represents an average value of CTOD values for five tests, and δc (min) represents the minimum value among the CTOD values for five tests.

In examples 1 to 7 and 15 to 29, yield strength (YS) was 430 N/mm² (MPa) or more, tensile strength was 502 N/mm² (MPa) or more, so that the strength of the base metal was sufficient. In regard to a CTOD value (δc) at −60° C., the minimum value δc (min) of the CTOD value in the FL notch was 0.42 mm or more, the minimum value δc (min) of the CTOD value in the IC notch was 0.60 mm or more, so that the fracture toughness was excellent.

On the other hand, in comparative examples, the steel had the same strength as that in the examples, but the CTOD value was poor as compared with the examples and thereby it was not suitable for used as a steel in a harsh environment.

In comparative examples 8 and 30, the C content in the steel was high, and the steel component parameter $P_{CTOD}$ and the steel component hardness parameter CeqH were also high. Therefore, both the CTOD value of the FL notch and the CTOD value of the FL notch were low.

In comparative examples 9, 12 to 14, 30, 31, and 33-37, the steel component hardness parameter CeqH was high. Therefore, in particular, the CTOD value of the IC notch was low.

In comparative examples 10 and 32, the Al content in the steel was high. Therefore, in particular, the microstructure control of the FL part was insufficient and the CTOD value of the FL notch was low.

In comparative examples 13 and 36, the Nb content in the steel was high. Therefore, in particular, the CTOD value of the IC notch was low.

In comparative examples 12 and 34, the Si content in the steel was high and the steel component hardness parameter CeqH was high. Therefore, in particular, the CTOD value of the IC notch was low.

In comparative examples 14 and 35, the V content in the steel was high, and the steel component parameter $P_{CTOD}$ and the steel component hardness parameter CeqH were high.

Therefore, both the CTOD value of the FL notch and the CTOD value of the IC notch were low.

The Al content was high in comparative steel 10, Mg and Ca were not added in comparative steel 11, the Si content was high in comparative steel 12, the amount of Mg+Ca was excessive and the CeqH was also high caused by the high Nb content in comparative steel 13, and Ca was excessive and both the $P_{CTOD}$ and the CeqH values were high caused by the high V content in comparative steel 14, such that the CTOD value was low in all of them.

In comparative steel 31, the Mn content was excessive and therefore the CeqH value was high, such that the CTOD value of the IC notch was low.

In comparative steel 32, the $P_{CTOD}$ and CeqH values were suitable, but the structure control at the vicinity of the FL was insufficient caused by the high Al content, such that the CTOD value of the FL notch was low.

In comparative steel 33, the amount of Mg+Ca was excessive, and the $P_{CTOD}$ and CeqH values were high, such that the CTOD value of the FL and IC notches was also low.

In comparative steel 34, the Si content was excessive, Mg and Ca were not added, and the CeqH value was high, such that the CTOD value of the FL and IC notches was low.

The V content was excessive in comparative steel 35, and the Nb content was excessive in comparative steel 22, such that the CeqH was high, and particularly, the CTOD value of the IC notch was low.

In the above-described comparative examples 8 to 14 and 30 to 38, in regard to the CTOD value (δc) at −60° C., the minimum value δc(min) of the CTOD value at the FL notch was less than 0.43 mm, the minimum value δc(min) of the CTOD value at the IC notch was less than 0.60 mm, so that the fracture toughness was not sufficient.

Figure 5:
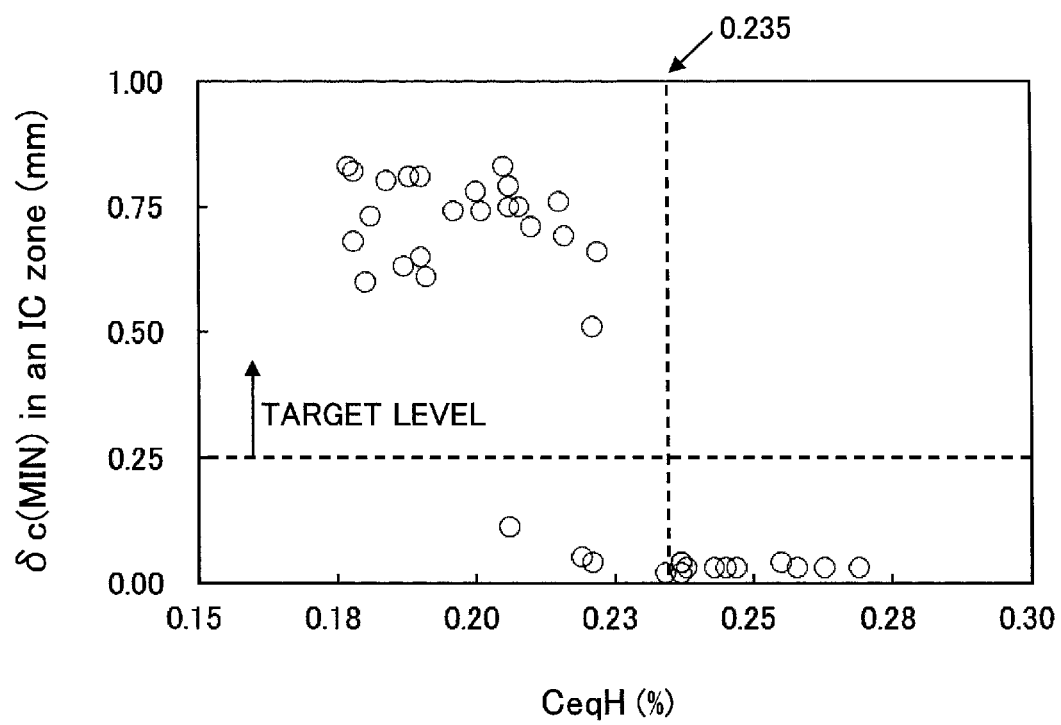
FIG. 5 is a diagram illustrating a relationship between a steel composition hardness parameter CeqH and a CTOD (δc) value in an IC zone at −60° C.

FIG. 5 shows the result of putting together the relationship between the steel composition hardness parameter CeqH and the CTOD (δc) value of the IC zone at −60° C. shown in Tables 1 to 4. As shown in FIG. 5, when each component in the steel and the steel composition parameter $P_{CTOD}$ satisfied the above-described conditions, it was possible to produce a steel of which the minimum value δc(min) of the CTOD value at the IC notch was 0.25 mm or more, by suppressing the steel composition hardness parameter CeqH to 0.235% or less. In addition, even when the steel composition hardness parameter CeqH was 0.235% or less, when each component in the steel and the steel composition parameter $P_{CTOD}$ did not satisfy the above-described conditions, it was impossible to produce the steel of which the minimum value δc(min) of the CTOD value was 0.25 mm or more (for example, comparative examples 8 and 37).

TABLE 1

| Classi-fication | Steel | Chemical composition (mass %) | | | | | | | | | | | | | | | | |
|---|---|---|---|---|---|---|---|---|---|---|---|---|---|---|---|---|---|---|
| | | C | Si | Mn | P | S | Al | Ti | N | Mg | Ca | O | Nb | V | Cu | Ni | $P_{CTOD}$ | CeqH |
| Examples | 1 | 0.013 | 0.08 | 2.44 | 0.004 | 0.002 | 0.003 | 0.011 | 0.0041 | 0.0012 | 0.0015 | 0.0022 | 0.000 | 0.016 | 0.12 | 0.12 | 0.026 | 0.215 |
| | 2 | 0.016 | 0.11 | 2.35 | 0.006 | 0.002 | 0.002 | 0.008 | 0.0036 | 0.0018 | 0.0009 | 0.0024 | 0.002 | 0.003 | 0.20 | 0.21 | 0.029 | 0.222 |
| | 3 | 0.019 | 0.16 | 2.19 | 0.005 | 0.003 | 0.004 | 0.010 | 0.0045 | 0.0017 | 0.0020 | 0.0016 | 0.000 | 0.000 | 0.00 | 0.36 | 0.024 | 0.208 |
| | 4 | 0.025 | 0.06 | 2.20 | 0.007 | 0.004 | 0.002 | 0.009 | 0.0031 | 0.0009 | 0.0010 | 0.0014 | 0.005 | 0.000 | 0.25 | 0.46 | 0.043 | 0.216 |
| | 5 | 0.041 | 0.07 | 2.03 | 0.004 | 0.002 | 0.003 | 0.009 | 0.0033 | 0.0005 | 0.0023 | 0.0017 | 0.002 | 0.000 | 0.10 | 0.15 | 0.048 | 0.205 |
| | 6 | 0.060 | 0.06 | 1.80 | 0.005 | 0.004 | 0.003 | 0.011 | 0.0038 | 0.0008 | 0.0018 | 0.0020 | 0.001 | 0.000 | 0.04 | 0.14 | 0.064 | 0.201 |
| | 7 | 0.063 | 0.05 | 1.71 | 0.005 | 0.002 | 0.003 | 0.010 | 0.0042 | 0.0011 | 0.0024 | 0.0023 | 0.000 | 0.000 | 0.00 | 0.10 | 0.064 | 0.191 |
| Comparative Examples | 8 | 0.068 | 0.18 | 1.82 | 0.005 | 0.003 | 0.003 | 0.012 | 0.0035 | 0.0012 | 0.0009 | 0.0029 | 0.000 | 0.000 | 0.01 | 0.00 | 0.068 | 0.234 |
| | 9 | 0.039 | 0.20 | 2.54 | 0.005 | 0.002 | 0.002 | 0.009 | 0.0029 | 0.0010 | 0.0018 | 0.0027 | 0.000 | 0.000 | 0.00 | 0.02 | 0.039 | 0.258 |
| | 10 | 0.030 | 0.19 | 2.11 | 0.004 | 0.003 | 0.026 | 0.013 | 0.0030 | 0.0012 | 0.0014 | 0.0030 | 0.001 | 0.000 | 0.01 | 0.00 | 0.030 | 0.219 |
| | 11 | 0.044 | 0.15 | 2.10 | 0.005 | 0.002 | 0.003 | 0.010 | 0.0024 | 0.0000 | 0.0000 | 0.0029 | 0.000 | 0.000 | 0.00 | 0.01 | 0.044 | 0.221 |
| | 12 | 0.040 | 0.39 | 1.98 | 0.004 | 0.003 | 0.003 | 0.010 | 0.0026 | 0.0013 | 0.0015 | 0.0024 | 0.001 | 0.000 | 0.01 | 0.02 | 0.041 | 0.269 |
| | 13 | 0.051 | 0.18 | 2.00 | 0.004 | 0.003 | 0.002 | 0.010 | 0.0026 | 0.0025 | 0.0028 | 0.0024 | 0.015 | 0.000 | 0.00 | 0.00 | 0.051 | 0.245 |
| | 14 | 0.056 | 0.11 | 2.29 | 0.004 | 0.003 | 0.002 | 0.009 | 0.0025 | 0.0011 | 0.0036 | 0.0026 | 0.002 | 0.031 | 0.00 | 0.00 | 0.066 | 0.255 |

TABLE 2

| Classi-fication | Steel | Chemical composition (mass %) | | | | | | | | | | | | | | | | |
|---|---|---|---|---|---|---|---|---|---|---|---|---|---|---|---|---|---|---|
| | | C | Si | Mn | P | S | Al | Ti | N | Mg | Ca | O | Nb | V | Cu | Ni | $P_{CTOD}$ | CeqH |
| Examples | 15 | 0.013 | 0.12 | 1.96 | 0.004 | 0.003 | 0.002 | 0.009 | 0.0038 | 0.0012 | 0.0013 | 0.0019 | 0.000 | 0.000 | 0.00 | 1.42 | 0.034 | 0.187 |
| | 16 | 0.016 | 0.09 | 1.90 | 0.005 | 0.002 | 0.004 | 0.011 | 0.0041 | 0.0016 | 0.0011 | 0.0022 | 0.001 | 0.018 | 0.23 | 1.29 | 0.052 | 0.206 |
| | 17 | 0.018 | 0.10 | 1.84 | 0.005 | 0.002 | 0.003 | 0.008 | 0.0036 | 0.0009 | 0.0016 | 0.0024 | 0.000 | 0.003 | 0.15 | 1.16 | 0.043 | 0.190 |
| | 18 | 0.020 | 0.15 | 1.91 | 0.006 | 0.003 | 0.003 | 0.010 | 0.0045 | 0.0020 | 0.0015 | 0.0016 | 0.002 | 0.000 | 0.00 | 1.01 | 0.035 | 0.196 |
| | 19 | 0.022 | 0.17 | 1.76 | 0.004 | 0.001 | 0.002 | 0.010 | 0.0029 | 0.0013 | 0.0024 | 0.0028 | 0.003 | 0.002 | 0.20 | 0.98 | 0.046 | 0.210 |
| | 20 | 0.025 | 0.09 | 1.78 | 0.006 | 0.004 | 0.003 | 0.009 | 0.0031 | 0.0011 | 0.0009 | 0.0014 | 0.000 | 0.000 | 0.05 | 0.85 | 0.040 | 0.178 |
| | 21 | 0.028 | 0.11 | 1.62 | 0.003 | 0.003 | 0.001 | 0.011 | 0.0025 | 0.0016 | 0.0021 | 0.0032 | 0.000 | 0.012 | 0.00 | 0.81 | 0.044 | 0.177 |
| | 22 | 0.030 | 0.10 | 1.67 | 0.004 | 0.002 | 0.002 | 0.012 | 0.0040 | 0.0015 | 0.0019 | 0.0018 | 0.001 | 0.004 | 0.09 | 0.75 | 0.047 | 0.184 |
| | 23 | 0.033 | 0.12 | 1.61 | 0.005 | 0.002 | 0.003 | 0.009 | 0.0033 | 0.0019 | 0.0015 | 0.0017 | 0.001 | 0.000 | 0.00 | 0.70 | 0.043 | 0.178 |
| | 24 | 0.037 | 0.08 | 1.82 | 0.005 | 0.002 | 0.003 | 0.008 | 0.0028 | 0.0008 | 0.0016 | 0.0025 | 0.000 | 0.009 | 0.00 | 0.69 | 0.050 | 0.190 |
| | 25 | 0.041 | 0.11 | 1.70 | 0.004 | 0.003 | 0.004 | 0.010 | 0.0037 | 0.0010 | 0.0014 | 0.0029 | 0.003 | 0.000 | 0.10 | 0.82 | 0.058 | 0.200 |
| | 26 | 0.046 | 0.09 | 1.59 | 0.005 | 0.001 | 0.003 | 0.010 | 0.0053 | 0.0009 | 0.0028 | 0.0024 | 0.004 | 0.005 | 0.00 | 0.66 | 0.058 | 0.188 |
| | 27 | 0.052 | 0.10 | 1.61 | 0.005 | 0.003 | 0.002 | 0.009 | 0.0022 | 0.0014 | 0.0012 | 0.0022 | 0.001 | 0.001 | 0.19 | 0.60 | 0.070 | 0.206 |
| | 28 | 0.055 | 0.07 | 1.55 | 0.006 | 0.004 | 0.002 | 0.011 | 0.0038 | 0.0014 | 0.0023 | 0.0020 | 0.000 | 0.000 | 0.00 | 0.58 | 0.064 | 0.181 |
| | 29 | 0.056 | 0.06 | 1.52 | 0.006 | 0.002 | 0.003 | 0.010 | 0.004 | 0.0013 | 0.0012 | 0.002 | 0.002 | 0.000 | 0.00 | 0.51 | 0.064 | 0.180 |
| Comparative | 30 | 0.069 | 0.19 | 1.82 | 0.005 | 0.003 | 0.003 | 0.012 | 0.004 | 0.0016 | 0.0014 | 0.003 | 0.004 | 0.000 | 0.00 | 0.63 | 0.078 | 0.247 |
| | 31 | 0.039 | 0.21 | 2.14 | 0.005 | 0.002 | 0.002 | 0.009 | 0.003 | 0.0009 | 0.0029 | 0.003 | 0.003 | 0.000 | 0.00 | 0.65 | 0.049 | 0.243 |
| | 32 | 0.045 | 0.20 | 1.76 | 0.004 | 0.003 | 0.028 | 0.013 | 0.003 | 0.0011 | 0.0016 | 0.003 | 0.003 | 0.000 | 0.00 | 0.69 | 0.055 | 0.221 |

TABLE 2-continued

| Classi-fication | Steel | Chemical composition (mass %) | | | | | | | | | | | | | | | | |
|---|---|---|---|---|---|---|---|---|---|---|---|---|---|---|---|---|---|---|
| | | C | Si | Mn | P | S | Al | Ti | N | Mg | Ca | O | Nb | V | Cu | Ni | $P_{CTOD}$ | CeqH |
| Examples | 33 | 0.050 | 0.16 | 1.90 | 0.005 | 0.002 | 0.003 | 0.012 | 0.002 | 0.0024 | 0.0037 | 0.003 | 0.002 | 0.000 | 0.15 | 0.80 | 0.069 | 0.237 |
| | 34 | 0.035 | 0.38 | 1.88 | 0.004 | 0.003 | 0.003 | 0.011 | 0.003 | 0.0000 | 0.0000 | 0.002 | 0.003 | 0.000 | 0.00 | 0.72 | 0.046 | 0.263 |
| | 35 | 0.045 | 0.19 | 1.82 | 0.004 | 0.002 | 0.004 | 0.009 | 0.003 | 0.0013 | 0.0026 | 0.002 | 0.003 | 0.026 | 0.00 | 0.71 | 0.064 | 0.237 |
| | 36 | 0.046 | 0.15 | 1.80 | 0.005 | 0.003 | 0.002 | 0.010 | 0.003 | 0.0014 | 0.0018 | 0.003 | 0.015 | 0.000 | 0.14 | 0.79 | 0.064 | 0.238 |
| | 37 | 0.053 | 0.12 | 1.75 | 0.005 | 0.002 | 0.002 | 0.011 | 0.003 | 0.0013 | 0.0014 | 0.003 | 0.002 | 0.015 | 0.22 | 1.02 | 0.080 | 0.237 |
| | 38 | 0.052 | 0.10 | 1.61 | 0.005 | 0.003 | 0.002 | 0.009 | 0.002 | 0.0014 | 0.0012 | 0.002 | 0.001 | 0.001 | 0.19 | 0.60 | 0.070 | 0.206 |

TABLE 3

| Classification | Steel | Heating temperature (° C.) | Heat treatment method | Plate thickness (mm) | Strength of base metal | | CTOD value of welded joint (test temperature: −60° C.) | | | |
|---|---|---|---|---|---|---|---|---|---|---|
| | | | | | YS (MPa) | TS (MPa) | FL notch | | IC notch | |
| | | | | | | | δc (av) (mm) | δc (min) (mm) | δc (av) (mm) | δc (min) (mm) |
| Examples | 1 | 1080 | ACC | 50 | 451 | 520 | 0.75 | 0.42 | 0.90 | 0.76 |
| | 2 | 1100 | CR | 45 | 442 | 512 | 0.80 | 0.48 | 0.86 | 0.66 |
| | 3 | 1050 | ACC | 45 | 465 | 519 | 0.79 | 0.51 | 0.91 | 0.75 |
| | 4 | 1000 | DQ | 60 | 439 | 505 | 0.69 | 0.44 | 0.95 | 0.69 |
| | 5 | 1100 | DQ | 50 | 462 | 524 | 0.78 | 0.57 | 0.93 | 0.83 |
| | 6 | 1080 | ACC | 50 | 439 | 509 | 0.76 | 0.48 | 0.89 | 0.74 |
| | 7 | 1100 | ACC | 50 | 446 | 513 | 0.74 | 0.46 | 0.83 | 0.61 |
| Comparative Examples | 8 | 1050 | ACC | 50 | 451 | 531 | 0.10 | 0.03 | 0.07 | 0.02 |
| | 9 | 1080 | ACC | 50 | 446 | 527 | 0.46 | 0.08 | 0.12 | 0.03 |
| | 10 | 1100 | ACC | 50 | 442 | 524 | 0.09 | 0.02 | 0.15 | 0.05 |
| | 11 | 1100 | ACC | 40 | 438 | 518 | 0.07 | 0.02 | 0.16 | 0.04 |
| | 12 | 1080 | ACC | 50 | 436 | 520 | 0.06 | 0.03 | 0.08 | 0.03 |
| | 13 | 1050 | ACC | 50 | 447 | 534 | 0.07 | 0.02 | 0.06 | 0.03 |
| | 14 | 1080 | ACC | 60 | 439 | 533 | 0.08 | 0.03 | 0.11 | 0.04 |

TABLE 4

| Classification | Steel | Heating temperature (° C.) | Heat treatment method | Plate thickness (mm) | Strength of base metal | | CTOD value of welded joint (test temperature: −60° C.) | | | |
|---|---|---|---|---|---|---|---|---|---|---|
| | | | | | YS (MPa) | TS (MPa) | FL notch | | IC notch | |
| | | | | | | | δc (av) (mm) | δc (min) (mm) | δc (av) (mm) | δc (min) (mm) |
| Examples | 15 | 1100 | ACC | 40 | 442 | 517 | 0.77 | 0.48 | 0.93 | 0.63 |
| | 16 | 1060 | ACC | 50 | 447 | 520 | 0.75 | 0.44 | 0.91 | 0.75 |
| | 17 | 1100 | ACC | 45 | 438 | 512 | 0.80 | 0.50 | 0.87 | 0.65 |
| | 18 | 1000 | CR | 50 | 461 | 519 | 0.79 | 0.51 | 0.92 | 0.74 |
| | 19 | 1080 | ACC | 50 | 437 | 506 | 0.83 | 0.61 | 0.89 | 0.71 |
| | 20 | 1050 | ACC | 50 | 435 | 505 | 0.69 | 0.46 | 0.96 | 0.68 |
| | 21 | 1060 | DQ | 60 | 430 | 502 | 0.72 | 0.55 | 0.95 | 0.83 |
| | 22 | 1000 | DQ | 60 | 436 | 511 | 0.65 | 0.52 | 0.90 | 0.80 |
| | 23 | 1100 | ACC | 50 | 458 | 524 | 0.78 | 0.57 | 0.94 | 0.82 |
| | 24 | 1050 | DQ | 45 | 454 | 529 | 0.76 | 0.49 | 0.95 | 0.81 |
| | 25 | 1080 | ACC | 50 | 465 | 537 | 0.75 | 0.52 | 0.94 | 0.78 |
| | 26 | 980 | ACC | 60 | 438 | 516 | 0.72 | 0.51 | 0.96 | 0.81 |
| | 27 | 1050 | DQ | 50 | 451 | 522 | 0.67 | 0.48 | 0.92 | 0.79 |
| | 28 | 1100 | ACC | 60 | 435 | 509 | 0.76 | 0.48 | 0.90 | 0.73 |
| | 29 | 1080 | ACC | 60 | 442 | 513 | 0.74 | 0.46 | 0.84 | 0.60 |
| Comparative Examples | 30 | 1080 | ACC | 50 | 447 | 531 | 0.08 | 0.05 | 0.07 | 0.03 |
| | 31 | 1080 | ACC | 50 | 442 | 527 | 0.62 | 0.43 | 0.09 | 0.03 |
| | 32 | 1050 | ACC | 40 | 438 | 524 | 0.07 | 0.03 | 0.72 | 0.51 |
| | 33 | 1050 | ACC | 50 | 434 | 518 | 0.09 | 0.04 | 0.12 | 0.02 |
| | 34 | 1100 | ACC | 60 | 432 | 520 | 0.23 | 0.11 | 0.08 | 0.03 |
| | 35 | 1100 | ACC | 60 | 444 | 534 | 0.37 | 0.13 | 0.08 | 0.04 |
| | 36 | 1080 | ACC | 50 | 435 | 533 | 0.41 | 0.17 | 0.09 | 0.03 |
| | 37 | 1100 | ACC | 50 | 451 | 552 | 0.12 | 0.04 | 0.13 | 0.04 |
| | 38 | 1150 | As roll | 50 | 334 | 461 | 0.62 | 0.45 | 0.61 | 0.11 |

As roll: general rolling in which a rolling temperature is not controlled, cooling after rolling is air-cooling

INDUSTRIAL APPLICABILITY

According to the invention, it is possible to provide a steel for welded structure excellent in a CTOD property of a heat-affected zone in welding of a low heat input to a medium heat input, and a producing method thereof.

What is claimed is:

1. A steel for a welded structure, comprising the following composition: by mass %, C at a C content [C] of 0.010 to 0.065%;
Si at a Si content [Si] of 0.05 to 0.20%;
Mn at a Mn content [Mn] of 1.52 to 2.70%;
Ni at a Ni content [Ni] of 0.69% to 1.50%;
Ti at a Ti content [Ti] of 0.005 to 0.015%;
O at an O content [O] of 0.0010 to 0.0045%;
N at a N content [N] of 0.002 to 0.006%;
Mg at a Mg content [Mg] of 0.0003 to 0.003%;
Ca at a Ca content [Ca] of 0.0003 to 0.003%; and
a balance of Fe and unavoidable impurities,
wherein, a P content [P] is limited to 0.008% or less,
a S content [S] is limited to 0.005% or less,
an Al content [Al] is limited to 0.004% or less,
a Nb content [Nb] is limited to 0.001% or less,
a Cu content [Cu] is limited to 0.03% or less,
a V content [V] is limited to 0.020% or less,
a Mo content [Mo] is limited to 0.05% or less, and
when a steel component parameter $P_{CTOD}$ is defined by a following equation (1), $$P_{CTOD}=[C]+[V]/3+[Cu]/22+[Ni]/67$$

and a steel component hardness parameter CeqH is defined by a following equation (2), $$CeqH=[C]+[Si]/4.16+[Mn]/14.9+[Cu]/12.9+[Ni]/105+1.12[Nb]+[V]/1.82$$

the $P_{CTOD}$ is 0.065% or less, and the CeqH is 0.196% or less.

2. The steel for welded structure according to claim 1, wherein a total amount of Mg and Ca is 0.0006 to 0.0030% by mass %.

3. A producing method of a steel for welded structure, comprising:
continuously casting steel to manufacture a slab satisfying the composition according to claim 1 or 2; and
heating the slab to a temperature of 950° C. to 1100° C. and then subjecting the slab to a thermo-mechanical control process.

* * * * *

UNITED STATES PATENT AND TRADEMARK OFFICE
CERTIFICATE OF CORRECTION

PATENT NO.        : 8,920,713 B2
APPLICATION NO.   : 13/138790
DATED             : December 30, 2014
INVENTOR(S)       : Yoshiyuki Watanabe et al.

It is certified that error appears in the above-identified patent and that said Letters Patent is hereby corrected as shown below:

IN THE SPECIFICATION

Column 4, line 19, change "target level ($T_{\delta c0.1\ (FL)} \leq 110\ °C.$)" to -- target level ($T_{\delta c0.1\ (FL)} \leq 110\ °C.$) --; and Column 8, line 5, change "$\epsilon$Cu precipitates" to -- $\varepsilon$Cu precipitates --.

Signed and Sealed this
Twentieth Day of October, 2015

Michelle K. Lee
*Director of the United States Patent and Trademark Office*